United States Patent [19]

Yellen

[11] 4,244,766
[45] Jan. 13, 1981

[54] LEG-SHEET PALLET ASSEMBLING DEVICE AND METHOD

[76] Inventor: Robert Yellen, 1210 Bahama Bend, Apt. A-2, Coconut Creek, Fla. 33066

[21] Appl. No.: 3,710

[22] Filed: Jan. 15, 1979

[51] Int. Cl.³ ............................................. B31F 3/00
[52] U.S. Cl. ................................. 156/211; 108/51.3; 156/253; 156/261; 156/291; 156/293; 156/513
[58] Field of Search .................. 156/250, 252–253, 156/261, 293–294, 513, 515, 257, 211, 291; 108/51.1, 51.3; 206/386, 599

[56] References Cited

U.S. PATENT DOCUMENTS

| | | | |
|---|---|---|---|
| 1,608,727 | 11/1926 | Dickey | 156/253 X |
| 2,507,588 | 5/1950 | Brandon et al. | 108/51.3 |
| 2,665,807 | 1/1954 | Budd | 206/599 |
| 3,052,397 | 9/1962 | Budd | 206/599 X |
| 3,954,540 | 5/1976 | Chamberlain | 156/253 |

*Primary Examiner*—David A. Simmons
*Attorney, Agent, or Firm*—Malin & Haley

[57] ABSTRACT

A method of arranging connecting material such as a suitable adhesive hot melt material in patterns on corrugated boards and assembling of pallets with legs at a remote site. The sheet or sheets of corrugated material are assembled by attaching the sheets singularly or in spaced apart juxtaposition to legs with connecting material therebetween. The connecting material may be first placed on each sheet in patterns for attaching the prismatic or tubular legs and then the sheets and prismatic or tubular legs are pressed together. The assembling device includes a central forming position and one or more stacking areas. The assembling device also includes connecting material activating means or connecting material supply means, stacking means, and press means. The stacking means receive the prismatic or tubular legs and at least one corrugated sheet for relative positioning. Each stacking means moves the sheets and legs into the central forming position for attachment purposes. An automatic or hand discharge means may thereafter remove the pallet from the central forming position.

8 Claims, 15 Drawing Figures

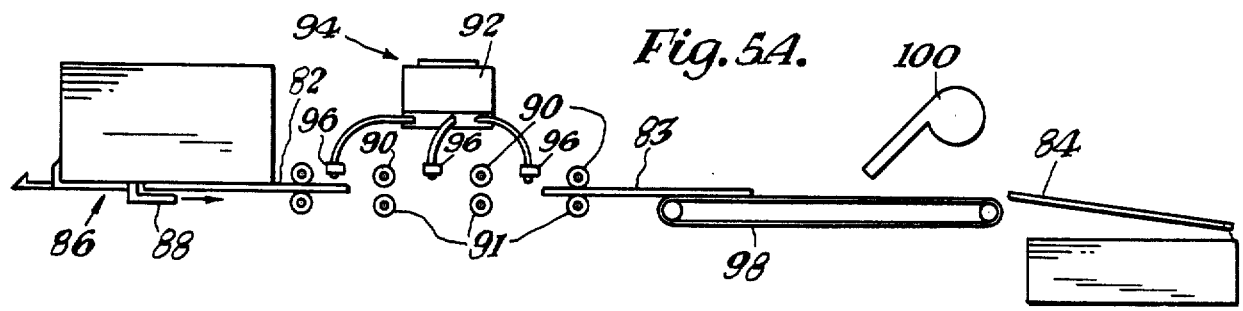
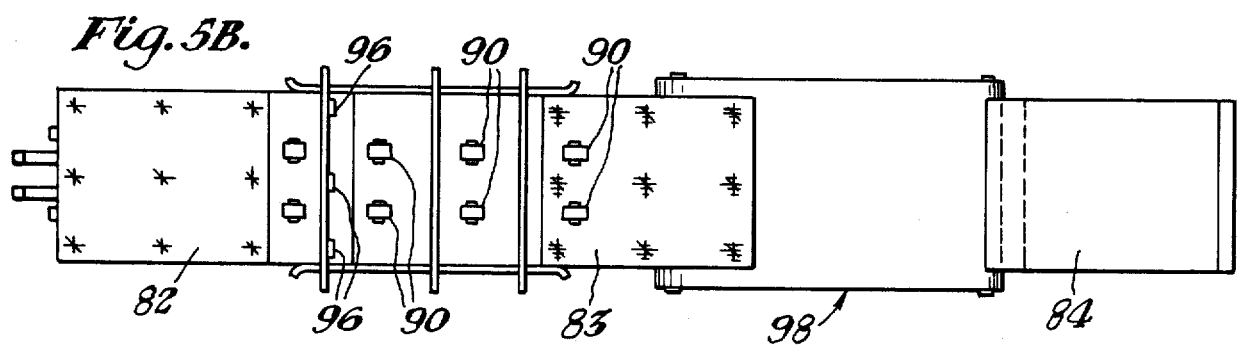
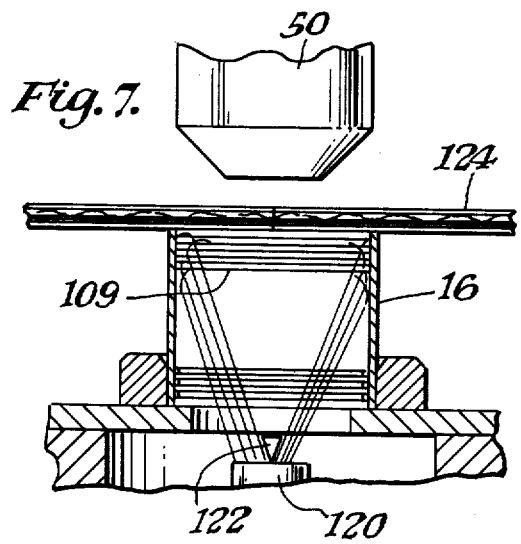
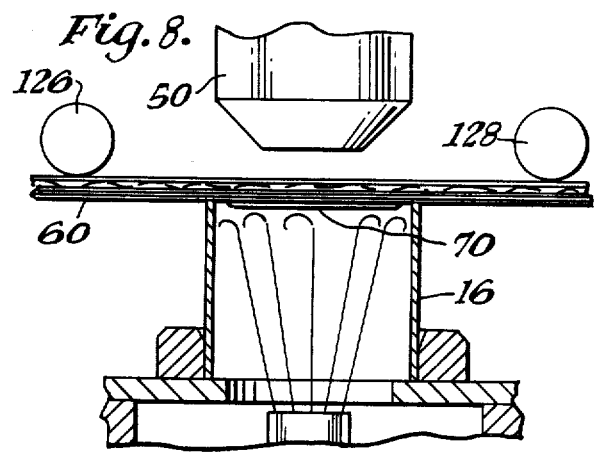
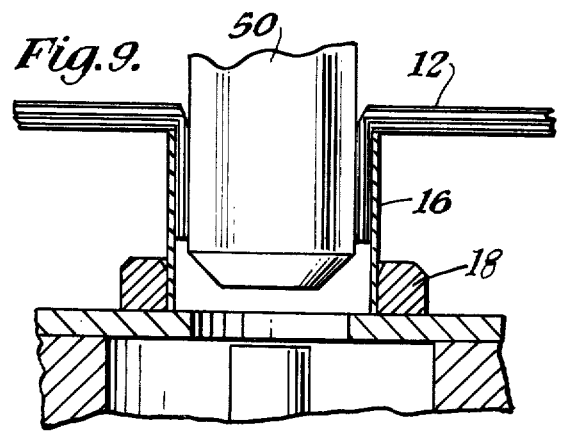
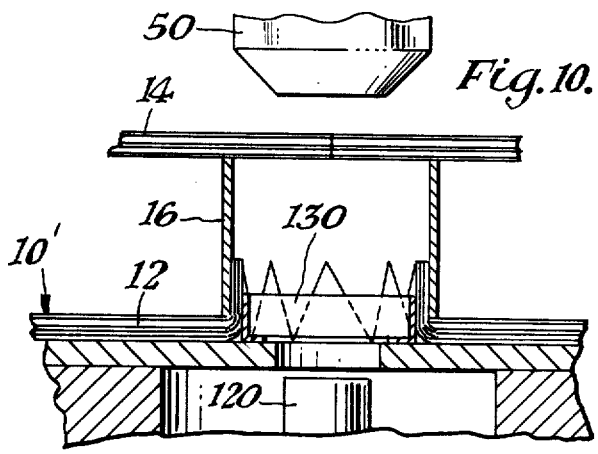

LEG-SHEET PALLET ASSEMBLING DEVICE AND METHOD

BACKGROUND OF THE INVENTION

This invention relates to a pallet assembling device and method. In the past, the pallets have been assembled at a manufacturing site for shipment to a user. Corrugated board pallets require shipment of large air spaces. Various plastic pallets have been designed that may be nested into one another for shipment. However, there appears to be no adequate nesting designs for double-deck corrugated board pallets shown in the prior art. Prior art corrugated pallets are described in the U.S. Pat. to Wilson, No. 3,055,624, Brandon et al No. 2,507,588, issued Jan. 29, 1947, Connelly No. 2,888,221, Simkins No. 3,407,758, and Budd No. 2,914,282.

BRIEF DESCRIPTION OF THE INVENTION

This invention relates to a method of prearranging patterns of connecting materials such as hot melt materials on corrugated boards or sheets in predesigned patterns such as stripes, dots, etc. at the corrugated board manufacturing site for shipment to a site as flat sheets or at a remote site during the final pallet assembly. The hot melt material may also be connected to pallet legs that may be positioned between corrugated boards or sheets. Thereafter, at a remote site, the process of connecting a sheet or sheets to legs, such as prismatic or tubular legs or spiral wound legs or box-like corrugated legs, is carried out. In one embodiment, after the connecting patterns have been positioned on the face of the corrugated board, the prismatic tube legs are connected. The legs and at least one sheet are positioned with respect to the connecting material to form a pallet. Thereafter, the connecting material is activated and the legs and the sheet are pressed together. A second sheet may be attached to the distal ends of the prismatic tube legs to form a double sheet pallet at the remote assembly site. To connect the components together, that is, to connect the legs and each sheet, they are both placed in a press where the connecting material is activated during the assembly in order to fix each corrugated sheet to the legs or the connecting material is sprayed onto the connecting area in order to fix each corrugated sheet to the legs.

The apparatus includes connecting material applicators or activators for use in the assembly process. Connecting applicator means, such as glue applicator means, may be used to provide patterns of connecting material on the corrugated board sheets or in the legs. Connecting material activator means such as hot air blowers may be used to melt the glue when attaching the legs to the sheets at the location of previously applied glue locations. The glue is positioned in patterns at intended leg locations. Cooling equipment may be used to cool the connecting material placed in patterns on the corrugated boards when the sheets are stored before the legs are attached and cooling equipment may also be used after the legs are attached.

A corrugated pallet assembly device may be located at any remote site and includes a central forming position and one or more oppositely disposed stacking areas, stacking means, a press means, and automatic or manual discharge means. The stacking means in one stacking area receives legs and the upper corrugated sheet for relative positioning. The stacking means is then moved into the central forming position for assembly. Another stacking area may be used to receive and position the corrugated sheet to which the tubes have already been attached in the first operation and another corrugated sheet. The second stacking means is moved into the central forming position for assembly of a two sheet pallet.

The movement of one stacking means into the central forming position automatically moves the oppositely disposed stacking means or mechanism out of the central forming area for unloading and reloading. Both stacking means position and hold the legs and sheets in proper position for movement into the central forming position and attachment of the legs to the properly positioned corrugated sheets.

The central forming position may contain activating means for activating the previously applied patterns of connecting material on the sheets or legs. The activated or melted connecting materials are used to attach the legs to each sheet. The process may include applying the connecting material to the sheets as well as attaching the legs to the sheets in the central forming area. A press means in the central forming position is utilized to press the components together.

It is an object of this invention to provide a non-complex method of assembling corrugated board pallets at assembly sites from flat stock and round stock.

It is another object of this invention to provide an economic method of preparing and shipping corrugated board material for assembling at assembly locations or remote locations.

Another object of this invention is to provide a method of shipping unassembled corrugated boards stock with or without preapplied connecting materials to the user's location for assembly of corrugated board pallets.

Another object of this invention is to provide a unique pallet board assembly device for assembling corrugated board pallets and for applying and activating the applied connecting material on the corrugated boards or in tubular legs for assembling a corrugated pallet.

Another object of this invention is to provide a unique pallet assembly device for assembling corrugated board pallets and applying adhesive material to the corrugated boards.

In accordance with these and other objects which will be apparent hereinafter, the instant invention will now be described with particular reference to the accompanying drawings.

BRIEF DESCRIPTION OF THE DRAWINGS

In the drawing:

FIG. 5A is a front view illustrating a device for applying adhesive to sheets of material.

FIG. 5B is a partial top view of FIG. 5A with certain members removed.

FIG. 7 is a cross-sectional side view of a portion of the compression peg and adhesive activator means.

FIG. 8 is another partial cross-sectional side view of a portion of the compression peg and adhesive activating means.

FIG. 9 is a partial cross-sectional side view of a leg being attached to a sheet after the glue is activated or applied.

FIG. 10 is a partial cross-sectional side view of a leg attached to one sheet and about to be attached to another sheet by glue dispensed from a glue dispenser.

DESCRIPTION OF THE INVENTION

Before the present pallet assembling device and method is specifically described, it is to be understood that the invention is not limited to the particular arrangement of parts or steps here shown, as such devices and methods may vary. It is also to be understood that the phraseology or terminology herein used is for purposes of description of particular embodiments and methods and not of limitation, as the scope of the present invention is denoted by the appended claims.

Figure 1:
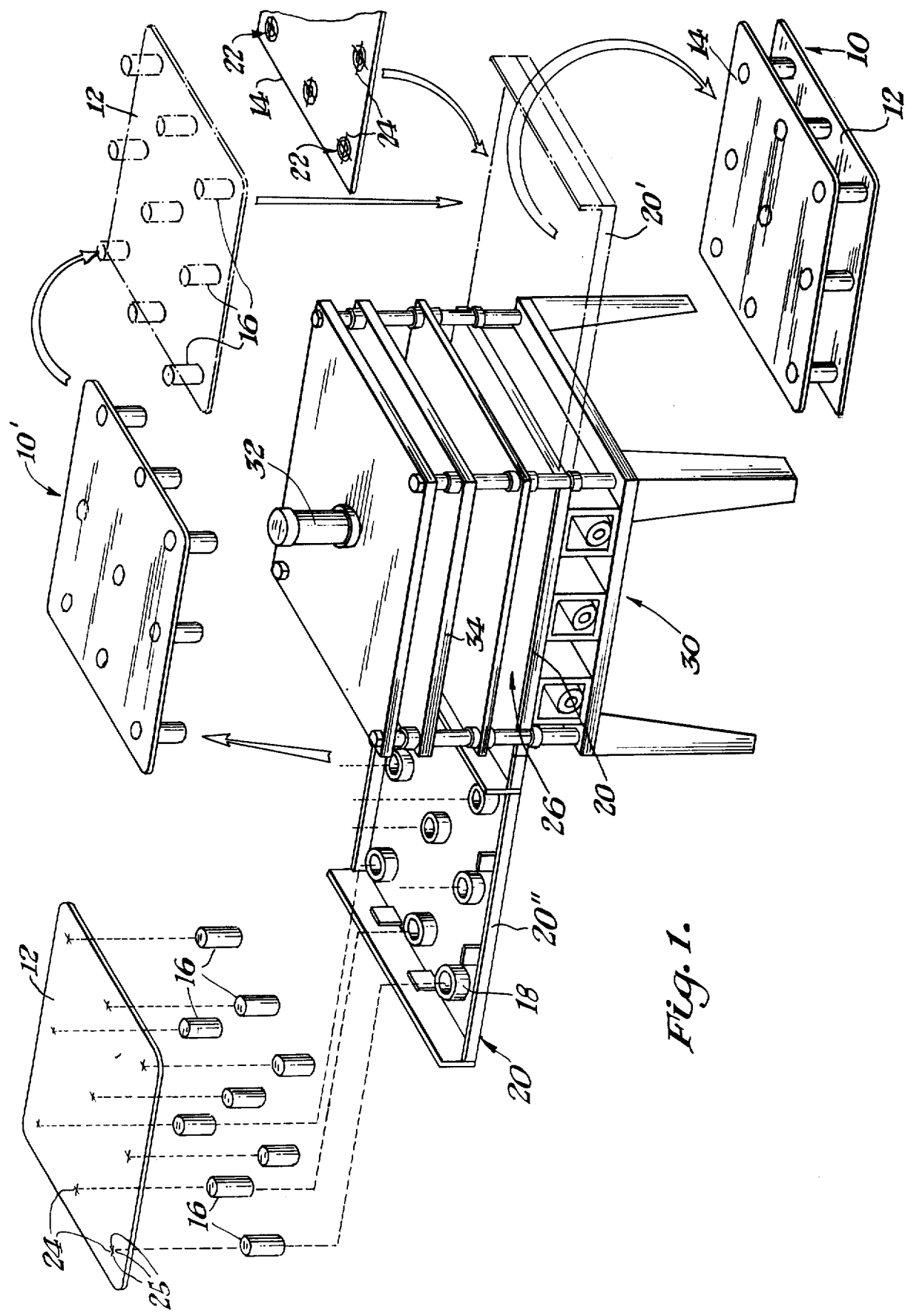
FIG. 1 is an isometric illustration of the pallet making machine illustrating the sequence in which the pallets are constructed.
Figure 3A:
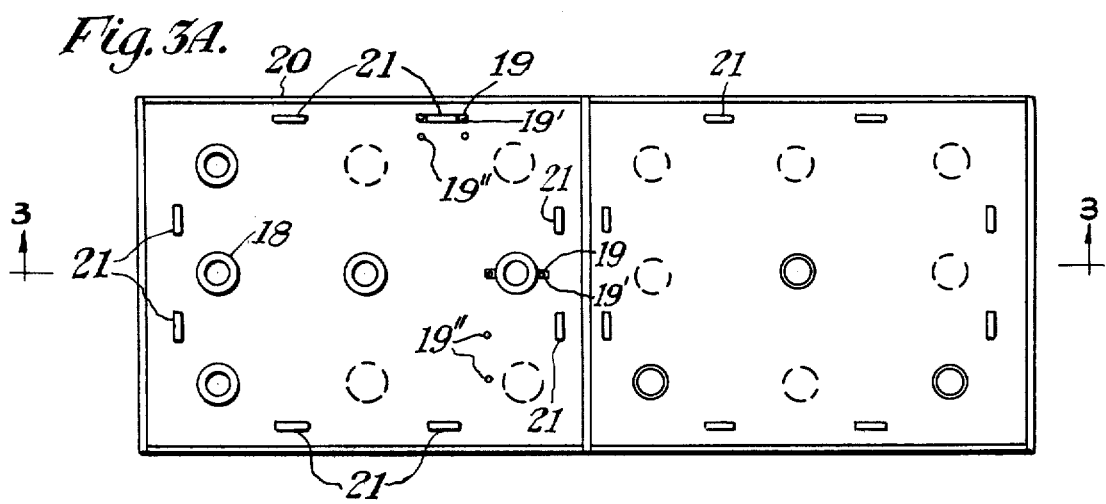
FIG. 3A is a plan view of a stacking means or sliding member of the machine.
Figure 3B:
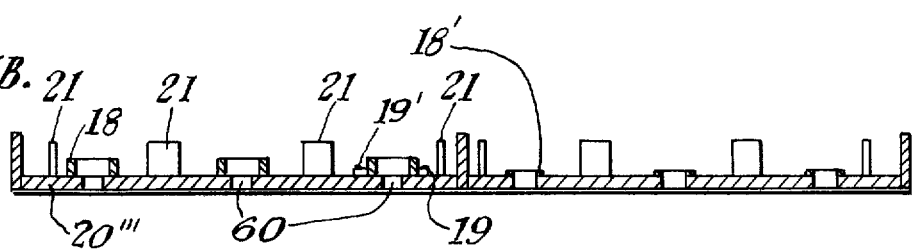
FIG. 3B is a cross-sectional side view of FIG. 3A taken along line 3—3 and looking in the direction of the arrows.

Referring now to the drawings and to FIG. 1 in particular, the basic sequence of operation is described showing the steps that may be followed in order to produce the final completed pallet 10 or 10'. A flat corrugated sheet 12 may be used as one side of a pallet and a second sheet 14 may be used as the other side. Legs 16, which are illustrated as round cylindrical tubes which are formed of hard plastic or other suitable rigid inexpensive material such as wound paper tubes, are placed in a holding device 18 illustrated as donut-shaped devices which are spacially arranged on the stacking means or holding tray 20. The holding devices may be adjustable to form various patterns. Connecting plate 19 may include connecting bolts 19' for attachment in any of a number of tapped holes 19" in tray 20. Various shaped legs may be used such as prismatic shaped legs with mating holding devices. The sheet of rigid corrugated paper board 12 having adhesive 22 on the lower side of sheet 12 and on the bottom side of sheet 14 (illustrated in a reverse position to show the glue patterns) and die cuts 24 specially arranged thereon (in the same placement pattern as the legs 16, are arranged on holding tray 20). Sheet 12 is then placed atop the legs 16 in holding tray 18. The holding devices 18 and number 21, shown in FIGS. 3A and 3B are to position the board 12 on the holding tray. Thereafter, the holding tray portion 20" is moved into the central forming portion 26 of the device 30. A series of heating devices or glue application devices are then activated to apply heat or adhesive as more fully set forth below. A compression piston means 32 forces the movable member 34 down to move pegs into engagement with board 12 and moves the die cut portions of the board, as shown at 25, into the interior of the legs 16. The legs 16 are thus attached to the board 12 by glue. The completed pallet having one board and a plurality of legs is shown as 10'. Pallet 10' may be used as a complete pallet or it may be considered a half complete pallet that is then fed back through the central forming portion 26 after it is turned over as shown in phantom and placed on the movable frame portion 20' between members similar to 18' so that board 14 can be turned over and placed on the top of the legs 16 and thereafter be attached to the ends of legs 16 in the same manner as described above, thus the completed pallet 10 with two boards is shown at 10. It should be noted that a different holding tray and board might be used, each having various arrangements of holders and die cuts on them to accommodate a particular design. The various arrangements of the legs result in different pallets which may be more useful for particular purposes.

The die cut patterns 24 may be scribed in any desired pattern. The cuts may be made either before or after the adhesive is placed on the sheet. The cuts may be made by knives attached to the distal ends of pegs 50.

Figure 2:
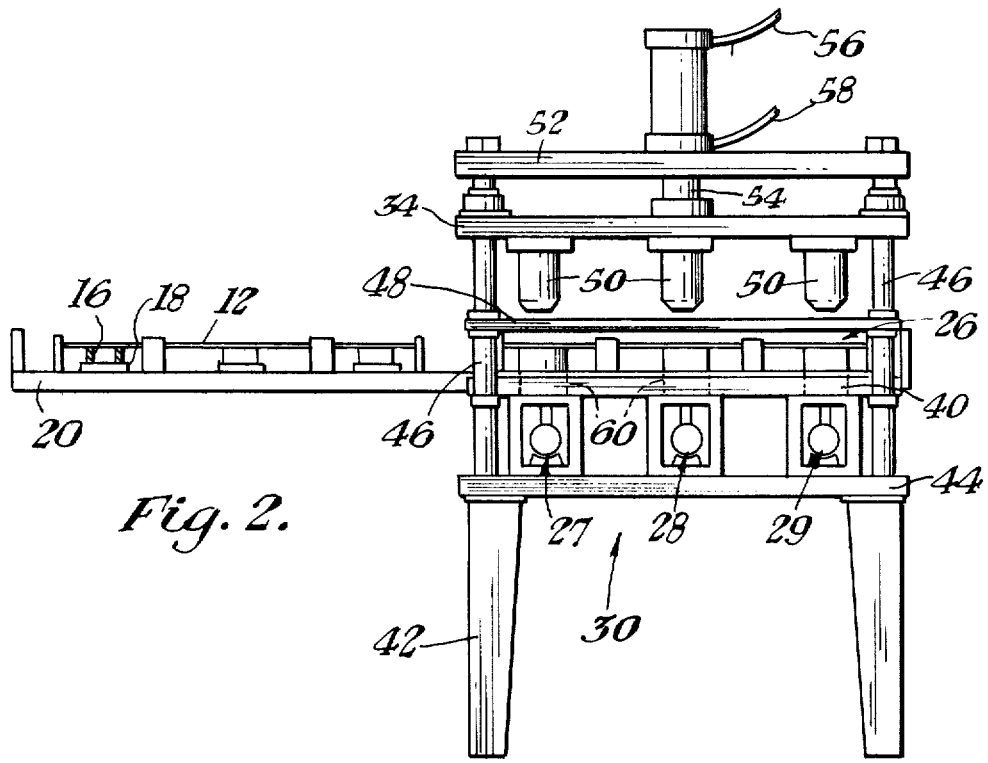
FIG. 2 is a front view of the pallet assembling machine.

Referring now to FIG. 2 in order to describe in more detail the structure and operation of the device, the holding tray 20 has legs 16 positioned in the donut-shaped holders 18 and sheet 12 is positioned between holding blocks 21. The central forming portion 26 of the device 30 is positioned on a stationary lower plate 40. The stationary lower plate may be a four-sided frame. The plate 40 is supported by device legs 42. A series of glue activation devices or glue application devices 27, 28, and 29 are positioned under the plate 40. Positioned immediately below the glue activators or glue applicators is support means 44. The holding tray 20 with its tray portion 20' is interlocked with supports 46 so that the holding tray 20 may be slid between the support 46 and held securely in forming portion 26. Any conventional lock or pin connector may hold the holding tray 20 in the position shown in FIG. 1 or in a central position. A restraining plate 48 is positioned above the support 40 to prevent the pallet from moving upward when pegs 50 are pulled out of sheet 12 or 14 by piston 32. The pegs 50 are connected to the vertically moveable plate 34 that is driven up and down by piston 32. Stationary plate 52 is positioned atop of moveable plate 34. A hydraulic cylinder 32 is connected to plate 52 and provides the means to force plate 34 via connecting rod 54 up and down on the four arms 46. Hydraulic fluid is forced into and out of conduit 56 and out of and into conduit 58 by hydraulic pump (not shown) to drive pegs 50 up and down. The pump may be driven by an electric motor (not shown). The position of pegs 50 and the number and design of the pegs can be arranged to suit the various designs of pallets desired. The position and number of glue applicators or activators 27, 28, and 29 can likewise be arranged on support means 44.

FIG. 3A shows an overhead view of the holding tray 20. The pattern for the holders 18 may be altered or changed from that shown by reconnecting the holders 18 in a different pattern. The holding blocks 21 are also adjustable as shown by using bolts 19' in connecting plate 19 to connect blocks to tray 20. FIG. 1 shows right portion as numeral 20' and a left portion as numeral 20". Plate 40 may also have holes in the same pattern as holes 60 that are on tray 20 (portion 20' and 20"), and the same pattern as the die cuts on boards 12 and 14, and the hole patterns in restraining plate 48. The holes allow adhesive to be sprayed up through the holes and onto the interior walls of the legs 16 or allows hot air to move up through the holes and onto the glue already present on the board. The glue or hot air is forced up from the devices 27, 28, and 29 shown illustrated in FIG. 2 as described in more detail hereinbelow. The holes in plate 48 allow the pegs to move through the plate.

Figure 4:
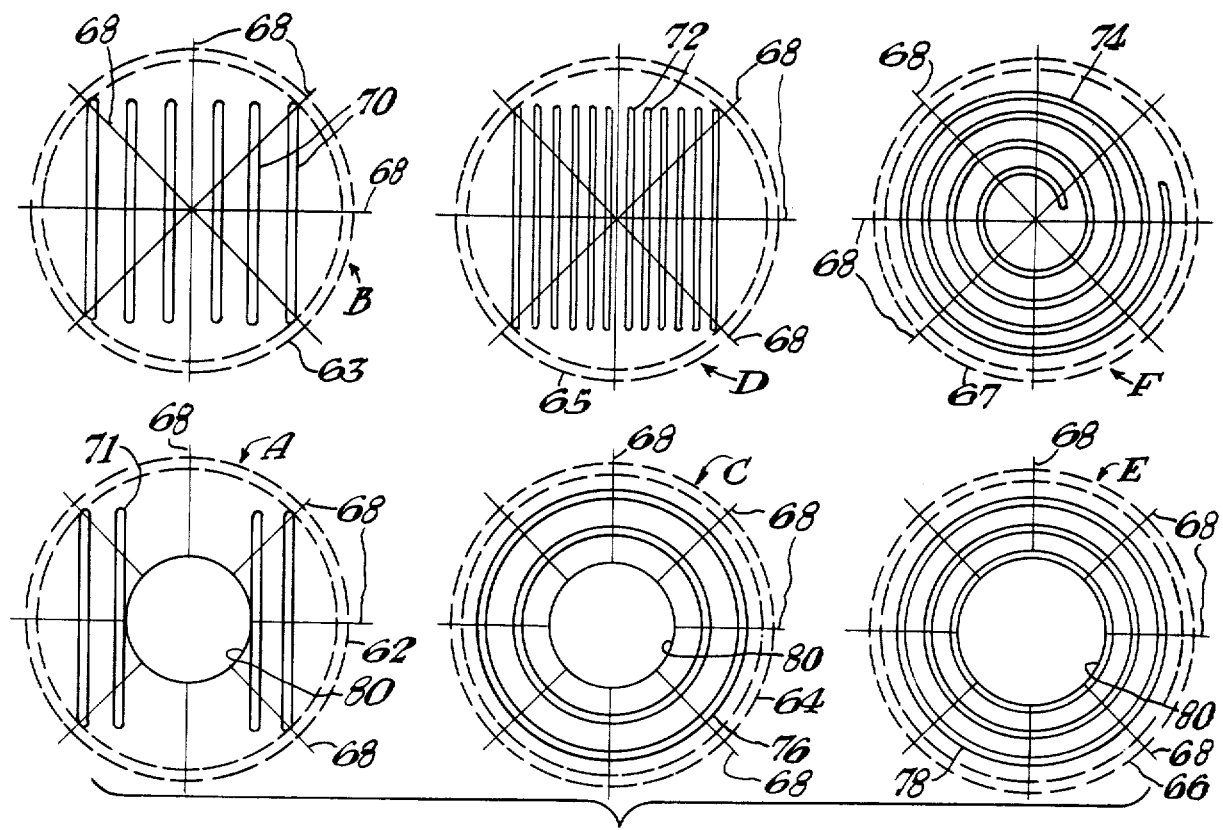
FIG. 4 is an overhead illustration of a corrugated board with six different glue patterns and with different die cuts on it for illustration purposes.
Figure 11:
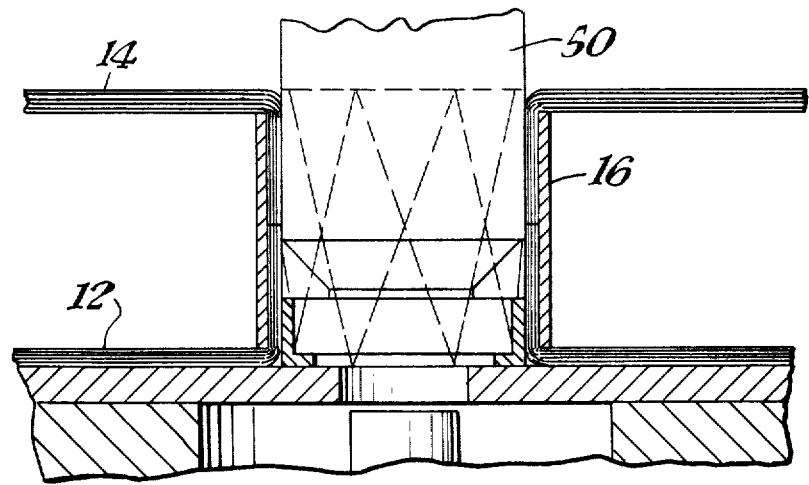
FIG. 11 is a partial cross-sectional side view of the compression peg moving the second sheet to attach a portion of the sheet to the leg after the glue is applied.

Referring now to FIG. 4, this illustration is to disclose the various ways in which the boards 12 and 14 might be prepared prior to assembling patent. The board is shown with six different pallet leg positions illustrated by circular dashed lines 62, 63, 64, 65, 66, and 67, each prepared in a different manner as shown by positions A, B, C, D, E, and F. Each of the positions A, B, C, D, E, and F have die cuts 68 which divide portions of the board into eight equal parts. A number of greater portions or a number of lesser portions may be used. The die cuts cause the boards to separate easily in a uniform manner when the piston forces plate 34 with pegs 50 onto the board 12 or 14 in order to move the eight equal parts into the legs 16 as shown in FIGS. 9 and 11. A plurality of rows of thin beads of hot melt may be used as shown at positions A, B, and D by numerals 70, 71, and 72 in FIG. 4. The rows are most suited for the automatic pre-application of the glue to insure glue deposit on each portion or segment which the die cuts parts. The application of adhesive in a spiral form as shown at 74 as shown in position F or in concentric rings 76 and 78 as shown in positions C and E are better suited for application by a hand-held hot melt gun. Positions A, C, and E are variations of positions B, D, and F. A center hole 80 has been cut in each of these positions A, C, and E. Obviously, if a center hole is cut, the ring pattern as shown by numerals 76 and 78 provides a good adhesive coverage. The nozzles or adhesive dispensers may also spray a layer of adhesive film on the sheet in a ribbon pattern or a single area. Factors such as the type of board, type or shape of legs, number and pattern of the legs to be placed on the board, and the type of machine used, may effect the specific type of hot melt and die cut patterns to be used.

Referring now to FIGS. 5A and 5B, which shows a side view of one means for applying the hot melt mechanically to the boards 82, 83, and 84 in a pattern as shown in positions A, B, and D in FIG. 4. The boards with die cuts in them have been stacked up on the kicker feeder 86. The kicker 86 feeds board 82 by movement to the right of finger member 88 by a drive means not shown. The kicker is of any well known design. The kicker drives each board individually into the powered driven rollers 90 and 91. The melt dispenser 94 includes a glue holder 92 that is timed to dispense on the boards running under the dispensing heads 96. The hot melt glue is applied or extruded onto the boards at the correct positions and in a correct pattern as illustrated in FIG. 4. The dispensing heads 96 are interchangeable and can be designed to vary the applied patterns. Once the hot melt is applied, the powered rollers 90 and 91 automatically move the board onto conveyor belt 98. While the board is on the conveyor belt 98, the hot melt is dried. The drying may be expedited via one or more air blowers 100. Obviously, a person holding a hot melt gun (not shown) may be used to replace the dispenser 94.

Figure 6A:
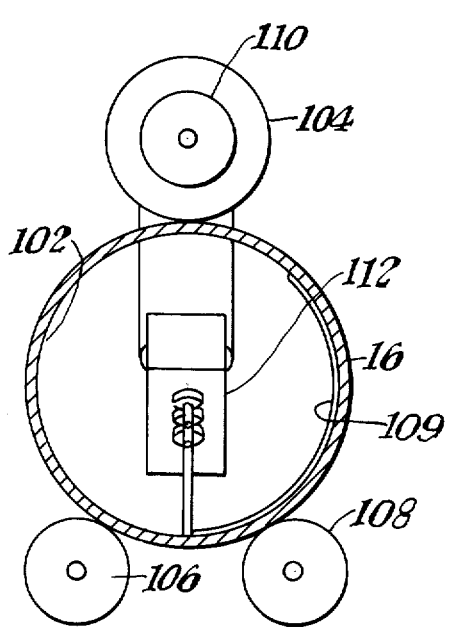
FIG. 6A is a side sectional view of a device for applying adhesive to the interior walls of a tubular leg.
Figure 6B:
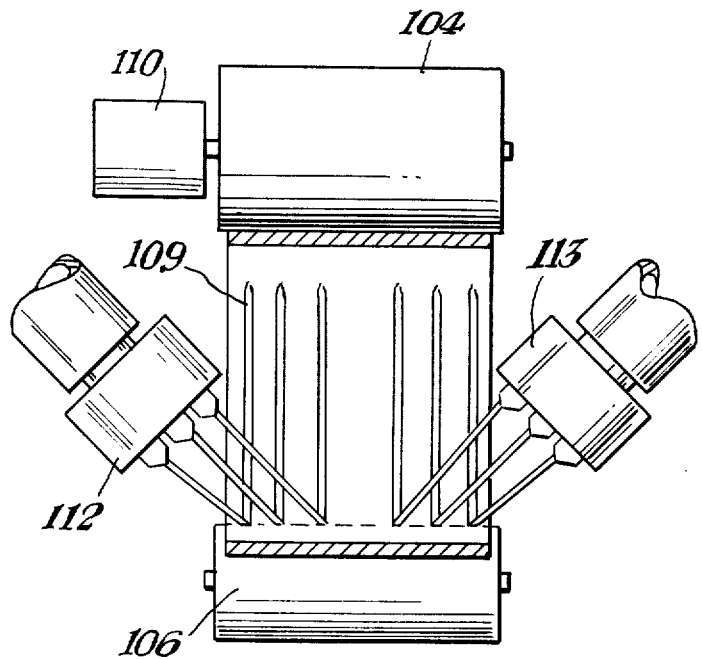
FIG. 6B is a front sectional view of a device partially in cross-section for applying adhesive to the interior walls of a tubular leg.

Referring now to FIGS. 6A and 6B, illustrating apparatus for placing hot melt on the interior wall 102 of each leg 16. The rollers 104, 106, and 108 hold the leg 16 in position. Roller 104 is driven by motor 110 in order to rotate the leg 16, thus rotating the leg during the application of the glue from the dispenser 112 or dispenser 113. The roller 108 is slideably moveable out of position to permit loading and unloading of the legs. It is not necessary to put glue on both the board and the interior of the walls of the legs. The hot melt is illustrated by number 109.

Now, referring to FIGS. 7, 8, 9, 10, and 11 in order to describe in detail the pallet forming process by which the legs are attached to the boards. In FIG. 7, the leg 16 has strips of pre-applied glue 109 on its interior wall near its upper and lower ends respectively. The hot air blower 120 may use an electric heating element and a blower (not shown). The air blower may be replaced by an adhesive or glue applicator. The blower 120 is positioned below a deflector 122 which directs the hot air onto the glue 109 at the upper end of the leg 16. The pegs or compression piston 50 is shown in the up position and the hot air from blower 120 is directed onto the glue 109. The hot air might also be directed to the board 60 if glue 70 has been pre-applied to it, as shown in FIG. 8. The board shown here has no center cut hole in it but the necessary die cuts have been made. FIG. 8 shows rollers 126 and 128, which may serve to hold the board against the leg 16.

FIG. 9 shows the compression peg 50 in the down position. As can be seen, the diameter of the peg 50 equals the inside diameter of the leg 16 minus twice the compressed thickness of the board 12, less the glue thickness. The peg 50 causes the board 12 to separate along the die cuts and forces the sections of the board, as defined by the die cuts, firmly against the interior walls of the leg 16, placing the glue between the board portion and the leg portion. After the desired number of legs have been attached to the board, the pallet is complete as shown by 10' in FIG. 1 and can be turned upside down and placed back in the same machine or another similar one to provide a pallet as shown by numeral 10. FIG. 10 shows a second sheet 14 in place on top of legs 16 of the half completed pallet 10'. The holding rings are not in the tray portion 20' as shown in FIGS. 1, 3A and 3B, they are replaced by the interior holding rings 130 which are capable of holding the half pallet 10' in place by fitting into the legs 16 after the board 12 has been connected into place. It should be noted that it is usually more convenient to use two different trays, as shown in FIG. 1. One tray with holders 18 on it and another with holders 130 on it. The holder 130 allows the glue from the applicator 120 to be shot on to the interior walls of leg 12 or onto the board 14. Applicator 120 may be replaced by a hot air applicator. When pre-applied glue is placed on the board 14 or in leg 16, the glue behind the board portions of 12 at the bottom is not reactivated by the hot air because the board portion of 12 keeps the heat from reaching the glue.

FIG. 11 shows the compression peg 50 in the down position. The sections of the board 14 along the die cut lines have been forced into place on the interior walls of the leg 16. The glue lies between the board portion of 14 and leg 16. When all of the legs 16 have been previously attached to the board 12, the pallet 10 is complete.

Figure 12:
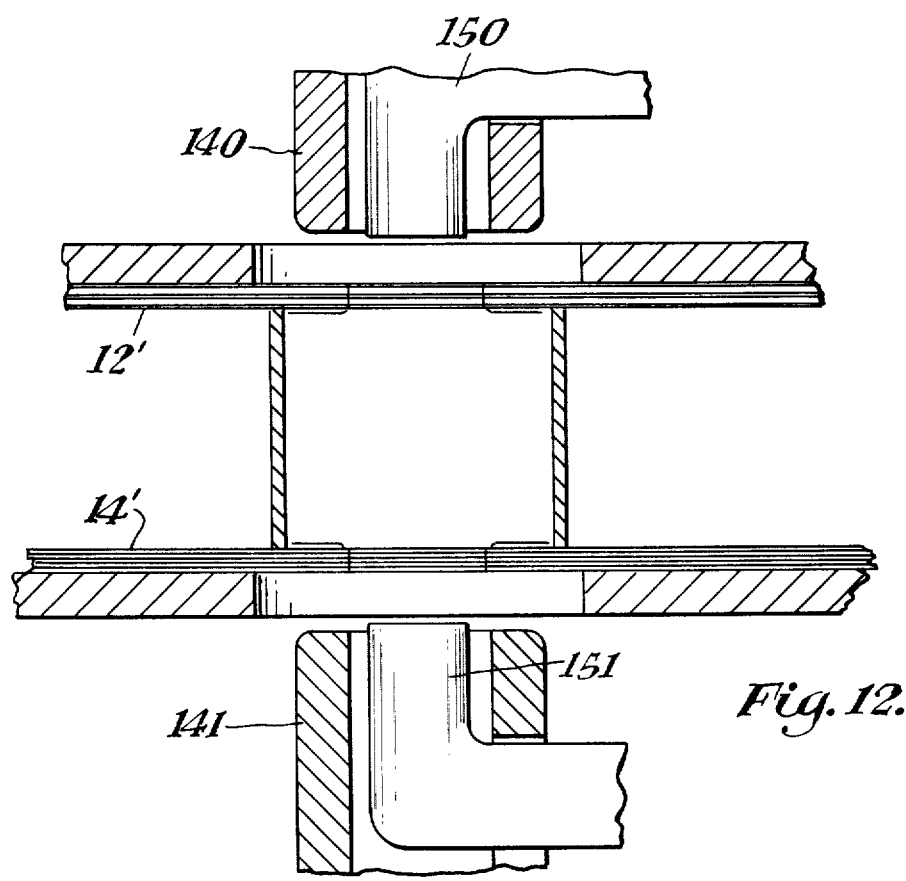
FIG. 12 is another partial cross-sectional side view of another embodiment of the device that activates the connecting material and attaches two sheets at one time to each leg.

FIG. 12 illustrates another embodiment of the device in which both upper compression pegs 140 and lower compression pegs 141 are used to complete a pallet 10 in a single operation. Within pegs 140 and 141 are sources of heat for preapplied hot melts as shown in FIGS. 7 through 9 or adhesive applicator as shown in FIGS. 6A and 6B. Pegs 140 and 141 may therefore have hot air blower heads in them or adhesive dispenser heads in them as shown as 150 and 151. When using this embodiment of the device, the boards 12' and 14' must have precut center holes as shown in A, C, and E of FIG. 4 so that heat and/or adhesive may be applied. Obviously, the device shown in FIG. 12 is capable of producing pallets in half the time of a machine with only upper compression pegs. Pegs 140 and 141 are moved in and out by piston means.

The instant invention has been shown and described herein in what is considered to be the most practical and preferred embodiments. It is recognized, however, that departures may be made therefrom within the scope of the invention and that obvious modifications will occur to a person skilled in the art.

What I claim is:

1. A method for producing a corrugated board pallet from at least one corrugated pallet sheet and a plurality of legs, comprising the steps of:
   forming at least one corrugated pallet sheet with a predetermined pattern of scribed areas,
   positioning on a tray with a predetermined pattern of apertures the pallet members in the pattern similar to the pattern of scribed areas, a hollow leg positioned in relation to each aperture position and in contact with one said corrugated pallet sheet scribed areas for adhesively connecting the legs to said corrugated pallet sheet;
   after positioning each said hollow leg providing active adhesive connecting means on the pallet members in a predetermined pattern to the legs and to said corrugated pallet sheet by operating connecting apparatus through said apertures;
   thereafter pushing the scribed areas of the corrugated pallet sheet by compressing means for compressing the scribed areas into the interior surface of legs and into engagement with the interior of the legs to secure the one sheet to the interior surface of the legs.

2. A method as set forth in claim 1, including the steps of:
   precutting said corrugated pallet sheet and precoating hot melt adhesive to said corrugated pallet sheet prior to positioning pallet members on said tray, and
   providing active adhesive connecting means having heating means for activating said hot melt adhesive.

3. A method as set forth in claim 1, wherein:
   said tray is moveable with respect to compressing means.

4. A method as set forth in claim 1, including the step of:
   precoating hot melt adhesive to said hollow legs prior to positioning same on said tray, and
   providing active adhesive connecting means having heating means for activating said hot melt adhesive.

5. A method as set forth in claim 1, including the steps of:
   forming a second corrugated pallet sheet with the predetermined pattern of scribed areas;
   positioning said one corrugated pallet sheet connected to said legs on a tray;
   positioning said second corrugated pallet sheet scribed area in relation to said legs;
   providing after positioning each said hollow leg and said second corrugated sheet, active adhesive connecting means on said pallet members to connect said second corrugated pallet sheet to said legs and to said first corrugated pallet sheet by operating connecting apparatus through said apertures;
   thereafter pushing the scribed areas of the second corrugated pallet sheet by compressing means for compressing the scribed areas into the interior surface of said legs and into engagement with the interior of the legs to secure said second sheet to the interior surface of the legs.

6. A method as set forth in claim 5, including the steps of:
   precutting said second corrugated pallet sheet and pre coating hot melt adhesive to said sheet prior to positioning pallet members on said tray, and
   providing active adhesive connecting means having heating means for activating said hot melt adhesive.

7. A method for producing a corrugated board pallet as set forth in claim 1 wherein:
   said hollow leg is a tubular hollow leg,
   said compressing means is a die punch having a punching area less than the inside cross-section area of said tubular hollow leg whereby said scribed area folded in upon said tubular hollow leg is spaced between the sides of said die punch and said interior surface of said tubular hollow leg.

8. A corrugated board pallet assembling device, comprising:
   a central forming position including a press means and connecting apparatus means;
   a first stacking area adjacent said central forming position;
   a member including a first stacking means for stacking legs including a leg connecting holding means with apertures for receiving hollow legs to be moved into said central forming position, said leg connecting holding means positionable in a predetermined pattern,
   said member including a sheet holding means for positioning the sheet relative to the positioned legs, said sheet including a predetermined pattern of scribed areas in the pattern similar to the pattern of leg connecting holding means;
   said tray movably connected to said central forming position for transferring said positioned legs and position sheet into said central forming position;
   said connecting apparatus means for providing active adhesive connecting means through said apertures onto the pallet, said connecting apparatus means positioned in said central forming portion adjacent the position of said first stacking means when said first stacking means is in said central forming position, said connecting apparatus means for adhesively preparing for connecting sheet portions in the scribed areas to said legs;
   drive means connected to said press means, and said connecting apparatus means,
   a plurality of peg means connected to said press means for reciprocal movement, said pegs are positioned relative to the sheet die cut positions to move the sheet portions in the scribed areas on to the inside surface of the hollow legs after providing active adhesive connecting means.

* * * * *